Sept. 14, 1965  I. KATZ  3,205,929
ANTI-SKID DEVICE
Filed May 4, 1964

*INVENTOR*
Irving Katz

ATTORNEY.

United States Patent Office 3,205,929
Patented Sept. 14, 1965

3,205,929
ANTI-SKID DEVICE
Irving Katz, 144—23 73rd Ave., Flushing, N.Y.
Filed May 4, 1964, Ser. No. 364,504
7 Claims. (Cl. 152—187)

This invention relates to an anti-skid device for vehicular tires. More specifically the invention relates to an inflatable, self-attaching member which can easily be secured to one or more of the tires of a vehicle in order to increase the tranction of the tire when the road condition is slippery due to the presence of snow or ice.

There have been previous attempts to provide satisfactory anti-skid devices such as the self-attaching but non-inflatable tread disclosed in United States Patent 2,580,272 to Philip W. Bell, issued December 25, 1951, and the non-inflatable traction cleat described in detail in United States Patent 2,692,632 to C. Q. Snedeker, issued October 26, 1954. However, neither of these prior devices provided treads which were self-clearing nor were these prior devices capable of being installed and removed from the vehicle tire with the ease with which the anti-skid device of this invention can be manipulated.

One object of this invention is to provide an anti-skid device which can can easily be fastened to a vehicle tire in order to reduce the tendency of the tire to skid on a slippery roadway.

Another object of the invention is to provide an anti-skid device which is extremely simple in construction, having a minimum of moving parts thereby substantially eliminating maintenance problems.

Still another object of the invention is the provision of a pneumatic anti-skid device which, when in operation, will not cause undue wear and tear on any closely adjacent portion of the tire or vehicle.

Yet another object of the invention is the provision of an anti-skid device which is inflatable and substantially self-attaching and which possesses a tread which is self-clearing.

According to the present invention there is provided an inflatable anti-skid device adapted to be secured to a vehicle time, comprising a hollow, integrally formed resilient member having a shape which conforms generally to the shape of a section of the tire, and an inflatable valve secured to said member for the admission of an inflation fluid to the interior thereof, said member being provided at its outer road-engaging surface with a tread pattern.

The present invention also provides an inflatable anti-skid device adapted to be secured to a vehicle tire, comprising a hollow, substantially U-shaped resilient member having a pair of legs in spaced parallel relationship, said legs being connected at one end by a bight portion, an inflation valve secured to said member for the admission of an inflation fluid to the interior thereof, said bight portion having an outer road-engaging surface provided with a tread pattern to increase the traction of said vehicle tire on a slippery roadway.

In order that the invention may be more clearly understood it will now be described, by way of example, with reference to the accompanying drawings in which.

Figure 1:
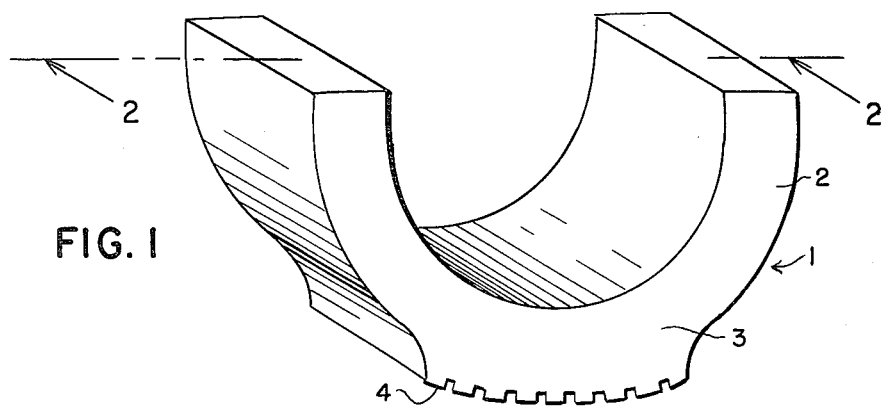
FIGURE 1 is a perspective view of the anti-skid device of the invention.

Referring to FIGURE 1 of the drawings 1 is the anti-skid member. It is hollow and of generally U-shape or horseshoe configuration. The device is given a pair of legs 2 which are spaced and extend in parallel relationship. The legs are adapted to hug a side portion of the tire 9 to which the device is to be affixed. A bight portion 3 connects one end of the legs, and of the outer road-engaging surface of the bight is provided with a tread pattern 4 which is designed to offer maximum traction on a slippery roadway. The member 1 is resilient and is preferably made of rubber or of a plastic material having physical properties comparable to rubber. Desirably the legs are formed or pre-stressed so that they conform generally to the shape of the tire.

Figure 2:
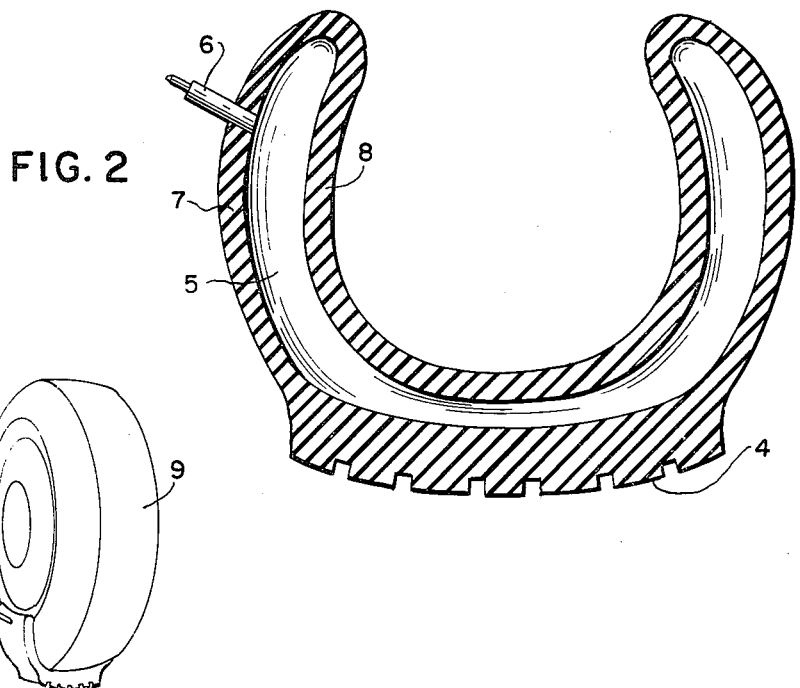
FIGURE 2 is a vertical section along line 2—2 of FIGURE 1.

As will be seen, from FIGURE 2 of the drawings, the device has an inflation chamber 5 served by inflation valve 6. As depicted, the inflation chamber may be defined by the outer and inner walls 7 and 8 respectively. However, it will be obvious to persons skilled in the tire art that a separate tube or impervious air compartment ¢an be provided within the hollow member.

The anti-skid device, as stated above, is generally U-shaped and is affixed to the tire in the fashion of a clip. In a preferred embodiment the legs of the member are formed so that the surface in contact with the tire exerts areas of localized increased pressure against the underlying portion of the said tire. This can be accomplished by forming the legs with preselected areas of thinner wall construction or with ridges which bear against the underlying tire. Other expedients for accomplishing this result will be well known to persons in the tire art.

Figure 3:
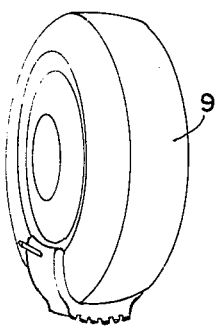
FIGURE 3 shows the anti-skid device of the invention attached to a vehicle tire.

The device extends around a segment of the circumferential extent of the underlying tire as shown in FIGURE 3 of the drawings. When initially positioned the device is in a deflated state. Once in place the member is inflated preferably with low pressure air of the order of 5 to 10 p.s.i. Inflation air may be supplied in several ways. The air in the tire can be cannibalized, i.e. a portion of the higher pressure air in the tire can be tapped off and directed into chamber 5 of member 1 until the pressure in the anti-skid member reaches the desired level. For this purpose a conduit or tube can be provided to connect the valve of member 1 with the valve of the tire. Such an arrangement can either be permanent with a control valve interposed to shut off the supply of air to member 1 when desired, or a detachable hose may be used to connect the tire valve with valve 6 of the anti-skid member until the proper amount of air is transferred from the tire to the member 1. Alternatively, air or another suitable inflation fluid may be supplied from a pressurized cylinder such as the well known $CO_2$ cartridge employed to inflate a Mae West lifevest. A bicycle pump or the usual gasoline station air pump can similarly be utilized to inflate the member. When the device is inflated, the legs 2 will be urged into closer proximity with the walls of the tire so that when the tire applies traction to the roadway via the anti-skid member in contact with the ground and upon rotation of the tire, the device cannot be dislodged.

A unique feature of the novel anti-skid device manifests itself in operation. As the tire rotates to a position where the device is in engagement with the roadway, the tread portion 4 grips the road and provides the necessary traction. At such time the inflation fluid in chamber 5 is forced into the legs of the device to thereby draw the member and tire into closer relationship. As the vehicle tire continues to rotate, the inflation fluid flows back into the bight portion of the member and causes a flexing of the tread to thereby clear same of any snow or ice which may have accumulated therein. Thus, it will be seen that the device is self-clearing, and the clogging of the treads is prevented. This insures the maintenance of a highly efficient tread structure.

To remove the member from the tire all that is required is to deflate the member until it can simply be slipped off the tire.

According to one specific embodiment of the invention the use of a plurality of inflatable tubes is contemplated. These tubes are positioned within the bight portion of the member and are intended to be used in place of or as a supplement to the treads 4 described above. A series of small holes are provided at some convenient area for the injection of inflation fluid by means such as a needle valve. When sufficient pressure is developed the tubes will emerge from the bottom of the device and will serve as tread ridges to increase traction with the roadway. When there is no longer any need for the anti-skid device the tubes are bled of inflation fluid and they retract into the bight of the member. According to still a further embodiment of the invention the tubes may be incorporated into the tread region of an otherwise conventional tire to be used as an anti-skid aid. In such event one can dispense with a separate member 1 described above.

Having described the invention in its presently preferred construction and use it will become readily apparent to persons skilled in the art that reasonable modification can be made without departing from the spirit and scope of the invention.

I claim:

1. An inflatable anti-skid device adapted to be secured to a vehicle tire, comprising a hollow, integrally formed resilient member having a shape which conforms generally to the shape of a section of the tire and of such circumferential extent that it will encompass a small portion of the circumference of a pneumatic tire, and an inflation valve secured to said member for the admission of an inflation fluid to the interior thereof, said member being provided at its outer road-engaging surface with a tread pattern.

2. An inflatable anti-skid device adapted to be secured to a vehicle tire, comprising a hollow, substantially U-shaped resilient member of such circumferential extent that it will encompass a small portion of the circumference of a pneumatic tire and having a pair of legs in spaced parallel relationship, said legs being connected at one end by a bight portion, an inflation valve secured to said member for the admission of an inflation fluid to the interior thereof, said bight portion having an outer road-engaging surface provided with a tread pattern to increase the traction of said tire on a slippery roadway.

3. An inflatable anti-skid device adapted to be secured to a vehicle tire, comprising a hollow, substantially U-shaped member formed of rubber or of a plastic material having comparable properties and of such circumferential extent that it will encompass a small portion of the circumference of a pneumatic tire, said member having a pair of legs positioned in spaced parallel relationship and connected at one end by a bight portion, an inflation valve secured to said member for the admission of an inflation fluid to the interior thereof, said bight portion having an outer road-engaging surface provided with a tread pattern to increase the traction of said vehicle tire on a slippery roadway.

4. An anti-skid device according to claim 1, wherein the legs of said member are pre-formed so that the member can be snapped into place about said tire while in a deflated state and can be urged into closer relationship therewith upon the admission of said inflation fluid to the interior of the member.

5. An anti-skid device according to claim 2, wherein the legs of said member are pre-formed so that the member can be snapped into place about said tire while in a deflated state and can be urged into closer relationship therewith upon the admission of said inflation fluid to the interior of the member.

6. An anti-skid device according to claim 4, wherein said member is formed with selected areas of the legs adapted to exert localized increased pressure against the underlying portion of the tire.

7. An anti-skid device according to claim 5, wherein said member is formed with selected areas of the legs adapted to exert localized increased pressure against the underlying portion of the tire.

References Cited by the Examiner

UNITED STATES PATENTS

| | | | |
|---|---|---|---|
| 1,989,402 | 1/35 | Cupp | 152—187 X |
| 2,491,491 | 12/49 | Freygang | 152—208 |
| 2,735,471 | 2/56 | McLean | 152—187 |
| 3,027,926 | 4/62 | Speer | 152—187 |

ARTHUR L. LA POINT, *Primary Examiner.*